(12) United States Patent
Poornachandran et al.

(10) Patent No.: US 10,389,788 B2
(45) Date of Patent: Aug. 20, 2019

(54) TECHNOLOGIES FOR ADAPTIVE REAL-TIME MEDIA STREAMING

(71) Applicant: Intel Corporation, Santa Clara, CA (US)

(72) Inventors: Rajesh Poornachandran, Portland, OR (US); Ned M. Smith, Beaverton, OR (US); Michael D. Rosenzweig, Hopkinton, MA (US); Vincent J. Zimmer, Federal Way, WA (US); Qixiong J. Bian, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 982 days.

(21) Appl. No.: 14/583,668

(22) Filed: Dec. 27, 2014

(65) Prior Publication Data

US 2016/0191595 A1 Jun. 30, 2016

(51) Int. Cl.
*G06F 15/16* (2006.01)
*H04L 29/06* (2006.01)

(52) U.S. Cl.
CPC ............ *H04L 65/607* (2013.01); *H04L 65/80* (2013.01)

(58) Field of Classification Search
CPC ........ H04L 65/607; H04L 43/08; H04L 65/80
USPC .......................... 709/219, 228, 230, 231, 232
See application file for complete search history.

(56) References Cited

U.S. PATENT DOCUMENTS

| | | | | |
|---|---|---|---|---|
| 9,378,784 B1* | 6/2016 | Vu | ............................ | G06F 5/10 |
| 2003/0041110 A1* | 2/2003 | Wenocur | ............. | G06Q 10/107 709/206 |
| 2006/0200253 A1* | 9/2006 | Hoffberg | ................ | G05B 15/02 700/19 |
| 2006/0210084 A1* | 9/2006 | Fransdonk | ............. | G06Q 20/12 380/278 |
| 2007/0094698 A1* | 4/2007 | Bountour | ............... | H04N 7/181 725/132 |
| 2007/0174474 A1* | 7/2007 | Zhong | ............... | H04L 29/06027 709/230 |
| 2007/0204311 A1* | 8/2007 | Hasek | ................ | H04N 7/17318 725/91 |
| 2008/0195761 A1* | 8/2008 | Jabri | ..................... | H04L 65/605 709/250 |
| 2010/0011100 A1* | 1/2010 | Kaneko | ................. | G06F 11/008 709/224 |

(Continued)

OTHER PUBLICATIONS

H. Schulzrinne et al., "Real Time Streaming Protocol (RTSP)", RFC 2326, Network Working Group, Apr. 1998.*

(Continued)

*Primary Examiner* — Yves Dalencourt
(74) *Attorney, Agent, or Firm* — Barnes & Thornburg LLP (57) ABSTRACT

Technologies for adaptive real-time media streaming include a computing device to determine, by a trusted execution environment of the computing device, a current workload of the computing device based on at least one activity counter. The at least one activity counter is to record counter data associated with performance of the computing device. Further, the computing device determines a residual workload capable of being supported by the computing device based on the determined current workload and a new content playback characteristics for streaming media content based on the determined residual workload. The computing device streams media content received from a trusted server based on the determined new content playback characteristics.

25 Claims, 4 Drawing Sheets (56) References Cited

U.S. PATENT DOCUMENTS

| | | | | | |
|---|---|---|---|---|---|
| 2010/0199086 | A1* | 8/2010 | Kuang | ............... | H04L 63/0869 713/155 |
| 2012/0221955 | A1* | 8/2012 | Raleigh | ............... | H04M 15/00 715/736 |
| 2012/0311094 | A1* | 12/2012 | Biderman | ............. | H04N 5/783 709/219 |
| 2013/0054972 | A1* | 2/2013 | Thorwirth | ........ | H04N 21/23439 713/176 |
| 2013/0185452 | A1* | 7/2013 | Burckart | ............ | H04L 65/4084 709/231 |
| 2013/0329777 | A1* | 12/2013 | Konda | ................... | H04L 67/04 375/240.01 |
| 2014/0040498 | A1* | 2/2014 | Oyman | ................ | H04W 24/04 709/231 |
| 2014/0040959 | A1* | 2/2014 | Oyman | ................ | H04N 21/6131 725/62 |
| 2014/0094159 | A1* | 4/2014 | Raleigh | ............... | H04W 24/02 455/418 |
| 2014/0244429 | A1* | 8/2014 | Clayton | ............ | G06Q 30/0631 705/26.7 |
| 2014/0244488 | A1* | 8/2014 | Kim | .................... | G06Q 20/123 705/39 |
| 2014/0359075 | A1* | 12/2014 | Amidei | ................ | H04L 65/607 709/219 |
| 2015/0007239 | A1* | 1/2015 | Cranman | ........... | H04N 21/2402 725/95 |
| 2015/0032901 | A1* | 1/2015 | Wang | ................. | H04L 65/4092 709/231 |
| 2015/0039680 | A1* | 2/2015 | Gallant | .................. | H04L 65/60 709/203 |
| 2015/0052236 | A1* | 2/2015 | Friedrich | ............... | H04L 43/08 709/224 |
| 2015/0143456 | A1* | 5/2015 | Raleigh | ................ | H04W 12/08 726/1 |

OTHER PUBLICATIONS

Sabharwal et al., "Towards Fine Grain Power Profiling Tools for SoC based Mobile Devices", 2013 4th Annual International Conference on Energy Aware Computing Systems and Applications (ICEAC), pp. 87-92.

* cited by examiner

TECHNOLOGIES FOR ADAPTIVE REAL-TIME MEDIA STREAMING

BACKGROUND

Ultra High Definition (UHD) media and associated Digital Rights Management (DRM) techniques require a large amount of data to be driven through various components of a computing device including, for example, security, graphics, and communication subsystems or Intellectual Property (IP) blocks. It should be appreciated that adaptive streaming is generally not scalable for UHD DRM content (e.g., for UHD DRM media playback sessions).

A challenge with UHD DRM involves the need to maintain the content rendering speed consistent with the rate of decryption in order to avoid glitches and/or audiovisual artifacts, especially to support concurrent UDH DRM media playback streaming on one or more displays. For example, in some circumstances, cryptographic keys are rotated in order to introduce a new key; however, the introduction of the new cryptographic key often causes a glitch due to the inability of the content streaming to keep pace with the cryptographic functions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
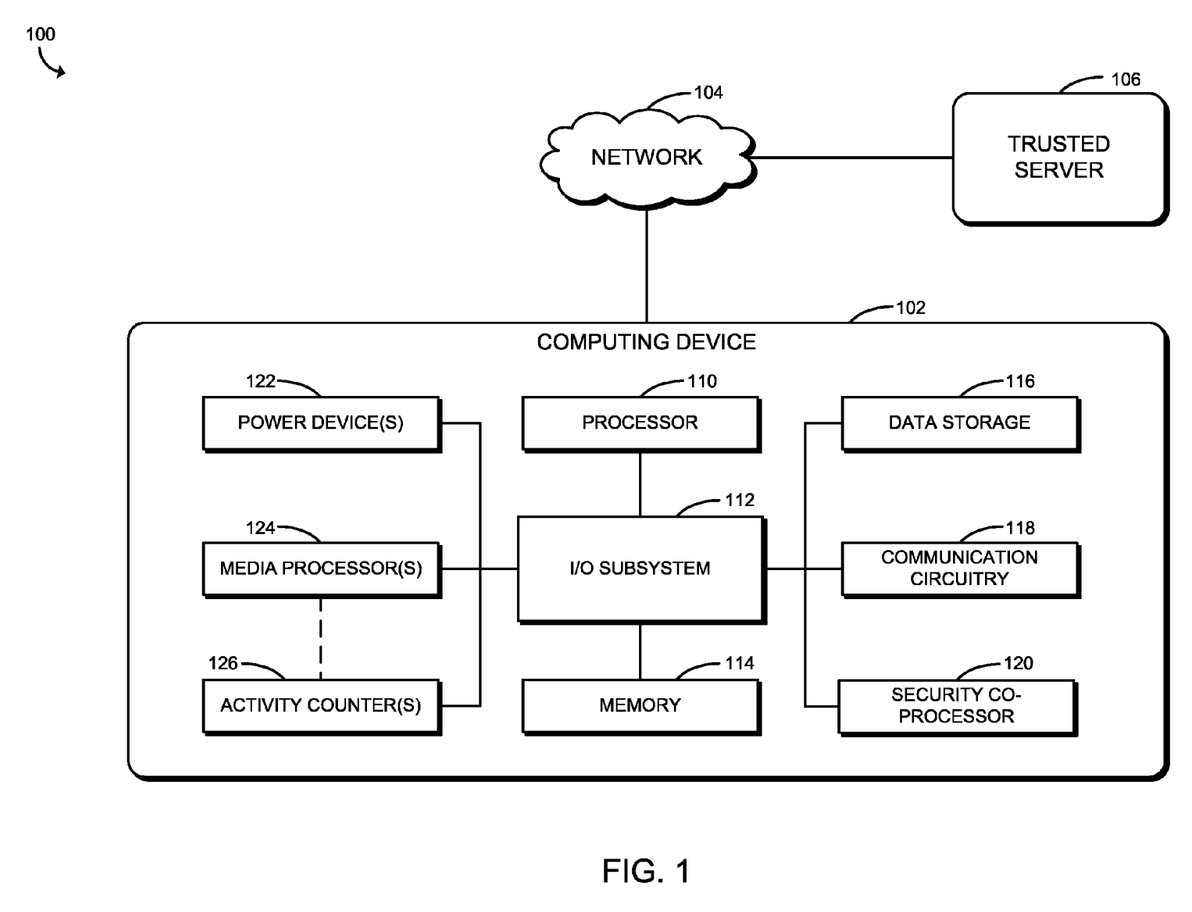
FIG. 1 is a simplified block diagram of at least one embodiment of a system for adaptive real-time media streaming.

Referring now to FIG. 1, a system 100 for adaptive real-time media streaming (e.g., UHD DRM media streaming) illustratively includes a computing device 102, a network 104, and a trusted server 106. Although only one computing device 102, one network 104, and one trusted server 106 are illustratively shown in FIG. 1, the system 100 may include any number of computing devices 102, networks 104, and trusted servers 106 in other embodiments. For example, in some embodiments, the trusted server 106 may communicate with multiple computing devices 102 to receive content playback characteristics/parameters from the computing devices 102 and/or transmit media to the computing devices 102 for streaming as described herein.

As described in detail below, in the illustrative embodiment, the computing device 102 includes a trusted execution environment (e.g., a hardware-based trusted execution environment provided by a security co-processor 120) that receives counter data (i.e., associated with the performance of the computing device 102) from performance activity counters 126 of various media IP blocks of the computing device 102 over an out-of-band communication channel or secure path (e.g., via dedicated traces) and/or power data from power devices 122 of the computing devices 102 (e.g., a power management unit). Further, as described herein, the computing device 102 determines a current workload of the computing device 102 based on the counter data and determines a residual workload capable of being supported by the computing device 102 based on the current workload of the computing device 102 and, for example, a maximum capable workload of the computing device 102. Based on the determined residual workload, the computing device 102 may determine new content playback characteristics (e.g., an appropriate bitrate) for streaming media and inform the trusted server 106 of those content playback characteristics and/or related data (e.g., the counter data and/or analytical results based on the counter data) securely.

As described herein, a trusted application (e.g., a trusted UHD DRM application running in a trusted execution environment such as a secure enclave) of the computing device 102 may securely communicate with the trusted server 106 to transmit content playback characteristics, receive media for streaming based on the content playback characteristics, and/or communicate other suitable data. In particular, the trusted execution environment of the computing device 102 may communicate with the trusted application of the computing device 102 over a secure communication channel or path (e.g., over a secure architectural enclave) in order to transmit the content playback characteristics and/or other data to the trusted server 106. It should be appreciated that, in some embodiments, the content playback characteristics and/or other data associated with the activity counters 126 may be transmitted over a secure backchannel or control channel, whereas the media content for streaming may be received over a secure DRM channel. As such, in some embodiments, the trusted server 106 may utilize the various metrics provided by the computing device 102 to "fine tune" the delivery of media to the computing device 102, for example, for an improved user experience. In some embodiments, the trusted application may leverage various components of the computing device 102 and credentials stored in the computing device 102 for license acquisition and playback.

The computing device 102 may be embodied as any type of computing device capable of performing the functions described herein. For example, the computing device 102 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, gateway, and/or any other computing/communication device. As shown in FIG. 1, the illustrative computing device 102 includes a processor 110, an input/output ("I/O") subsystem 112, a memory 114, a data storage 116, a communication circuitry 118, a security co-processor 120, one or more power devices 122, one or more media processors 124, and one or more activity counters 126. Of course, the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 102 useful for performing the functions described herein.

The communication circuitry 118 may be embodied as any communication circuit, device, or collection thereof, capable of enabling communications between the computing device 102 and other remote devices over the network 104 (e.g., the trusted server 106). The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The security co-processor 120 may be embodied as any hardware component(s) or circuitry capable of establishing a trusted execution environment and/or otherwise performing the functions described herein. For example, in some embodiments, the security co-processor 120 may be embodied as a Converged Security and Manageability Engine (CSME), a security engine, a trusted platform module (TPM), or an out-of-band processor. It should be appreciated that the security co-processor 120 may be tamper resistant and include secure storage and processing capabilities such that malware attacks on the host operating system of the computing device 102 do not affect the trusted execution environment of the security co-processor 120. As discussed below, in some embodiments, one or more secure communication channels or paths (e.g., dedicated traces) are established between the security co-processor 120 and the activity counters 126 and/or the power devices 122 such that a trusted execution environment of the security co-processor 120 may receive the counter data and/or power data of the corresponding components in an out-of-band manner. Further, the security co-processor 120 may communicate with a trusted application of the computing device 102 (e.g., executing on a host operating system) by virtue of a secure communication channel (e.g., a secure architectural enclave) established between the trusted execution environment of the security co-processor 120 and that of the trusted application running, for example, on a secure enclave (or other trusted execution environment) of the processor 110.

Each of the power devices 122 may be embodied as any hardware component(s) or circuitry capable of performing the functions described herein. In particular, the power devices 122 regulate, manage, and/or otherwise handle the power delivery and/or power diagnostics for various components of the computing device 102. For example, the power devices 122 may include a power management unit (PUNIT) and/or a power management integrated circuit (PMIC). In some embodiments, the power devices 122 may determine the power state of various components of the computing device 102 at a given point in time (e.g., whether the component is in a low-power sleep state, a full active power state, or a partially active power state). Further, in some embodiments, the trusted execution environment of the security co-processor 120 may communicate with the power devices 122 to receive power data of the computing device 102 including, for example, power constraints/parameters, thermal constraints/parameters, and/or performance characteristics of the computing device 102 and/or components of the computing device 102 (e.g., the media processors 124).

Each of the media processors 124 may be embodied as any hardware component(s) or circuitry capable of performing the functions described herein. For example, the media processors 124 may include IP blocks and/or other components/accelerators (e.g., media/security accelerators). In particular, in some embodiments, the media processors 124 may include a CSME, graphics processor, video decoder, video encoder, display controller, and/or other suitable IP blocks. As described herein, in the illustrative embodiment, each of the media processors 124 includes one or more activity counters 126 to record counter data associated with the performance of the computing device 102 or, more particularly, the performance of the corresponding media processor 124 of the computing device 102. Of course, in some embodiments, the security co-processor 120, the power devices 122, and/or other components of the computing device 102 may also include activity counters 126. Further, it should be appreciated that the number and stored data of the activity counters 126 may vary depending on the particular embodiment. Further, the activity counters 126 may be hardware-, firmware-, and/or software-based depending on the particular embodiment.

The network 104 may be embodied as any type of communication network capable of facilitating communication between the computing device 102 and remote devices (e.g., the trusted server 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The trusted server 106 may be embodied as any computing device capable of performing the functions described herein. For example, the trusted server 106 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, gateway, and/or any other computing/communication device. In some embodiments, the trusted server 106 may include components similar to the components of the computing device 102 described above and/or components commonly found in a computing device such as a processor, memory, I/O subsystem, data storage, peripheral devices, and so forth, which are not illustrated in FIG. 1 for clarity of the description. Of course, in some embodiments, one or more components of the computing device 102 may be omitted from the trusted server 106 (e.g., the media processors 124 and/or activity counters 126).

Figure 2:
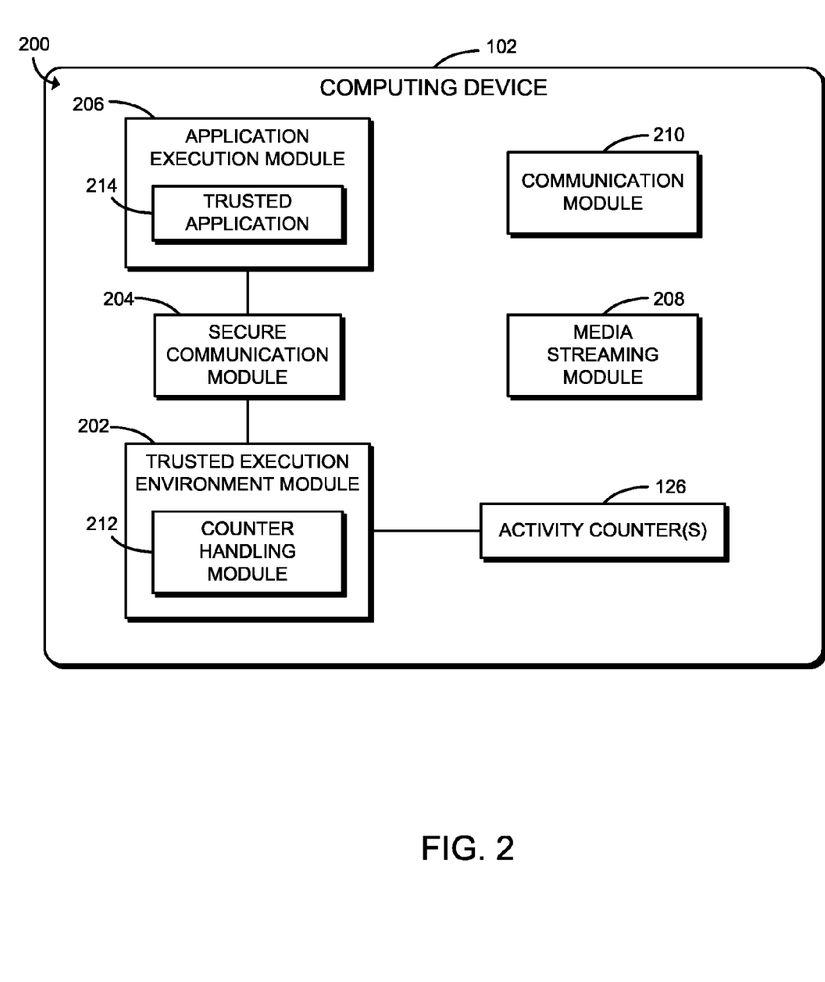
FIG. 2 is a simplified block diagram of at least one embodiment of an environment of the computing device of the system of FIG. 1.

Referring now to FIG. 2, in use, the computing device 102 establishes an environment 200 for adaptive real-time media streaming. The illustrative environment 200 of the computing device 102 includes a trusted execution environment module 202, a secure communication module 204, an application execution module 206, a media streaming module 208, and a communication module 210. Additionally, the trusted execution environment module 202 includes a counter handling module 212. The various modules of the environment 200 may be embodied as hardware, software, firmware, or a combination thereof. For example, the various modules, logic, and other components of the environment 200 may form a portion of, or otherwise be established by, the processor 110 or other hardware components of the computing device 102. As such, in some embodiments, one or more of the modules of the environment 200 may be embodied as a circuit or collection of electrical devices (e.g., a trusted execution environment circuit, a secure communication circuit, an application execution circuit, a media streaming circuit, and/or a communication circuit). Additionally, in some embodiments, one or more of the illustrative modules may form a portion of another module and/or one or more of the illustrative modules may be embodied as a standalone or independent module.

The trusted execution environment module 202 establishes a trusted execution environment for secure execution of operations on the computing device 102. As such, depending on the particular embodiment, the trusted execution environment module 202 may perform various security-related functions (e.g., attestation and cryptography) to establish secure connections between components/modules of the computing device 102 and/or between the computing device 102 and remote devices (e.g., the trusted server 106). It should be appreciated that, in doing so, the trusted execution environment module 202 may utilize any suitable security protocols and/or features (e.g., SIGMA, TLS, secure memory, etc.). Further, in various embodiments, the trusted execution environment module 202 may perform any one or more of the other functions described herein. In particular, in the illustrative embodiment, the trusted execution environment module 202 may establish a secure out-of-band communication link with the activity counters 126 (e.g., via dedicated hardware traces or another secure path) to receive counter data associated with the performance of the computing device 102. Similarly, the trusted execution environment module 202 may establish a secure out-of-band communication link with the power devices 122 to receive power data (e.g., power, thermal, and/or other performance characteristics) of the computing device 102.

As indicated above, in the illustrative embodiment, the trusted execution environment module 202 includes a counter handling module 212 that is configured to handle the collection and/or processing of counter data received from the activity counters 126. For example, as described above, the counter data may include data associated with various media processors 124 and/or IP blocks including a CSME, graphics processor/engine, video decoder, video encoder, display control, and/or other suitable components. In particular, as described herein, the counter handling module 212 may determine a current workload of the computing device 102 based on the counter data and may determine a residual workload capable of being supported by the computing device 102 based on the current workload and, for example, a maximum capable workload of the computing device 102. In other words, the counter handling module 212 may determine how "busy" various components of the computing device 102 are at a particular point in time. The counter handling module 212 may further determine new content playback characteristics (e.g., an appropriate bitrate, resolution, buffering, responsiveness, and/or other characteristics) for streaming media based on the residual workload. In other embodiments, the trusted execution environment module 202 may transmit the counter data, power data, and/or other collected data to the trusted application and/or another component of the computing device 102 for further analysis. For example, in some embodiments, the trusted execution environment module 202 may transmit contextual data collected from sensors of the computing device 102 and/or from sensors accessible via a wired or wireless network (e.g., Wi-Fi®, Bluetooth®, ANT+™, Zibgee®, Z-wave®, Insteon®, ANSI 709, etc.).

In some embodiments, the trusted execution environment module 202 may establish one or more secure channels (e.g., a secure backchannel or control channel and a secure DRM content channel) to the trusted server 106 (e.g., a trusted UHD DRM server) by virtue of an connection "owned" by a trusted application 214 of the computing device 102 (i.e., a connection established between the trusted application 214 and the trusted server 106). In doing so, the trusted execution environment module 202 may share credentials of the computing device 102 with the trusted application 214 and/or the trusted server 106. In other words, the trusted execution environment module 202 may establish a connection with the trusted server 106 independent of the host operating system of the computing device 102. In such embodiments, the data passed from the trusted execution environment module 202 to the trusted server 106 through the trusted application 214 may be opaque to the trusted application 214 and/or the host operating system. As described herein, the trusted execution environment module 202 may communicate with the trusted application 214 in a secure manner by virtue of the secure communication module 204, which may establish a secure communication channel between the trusted execution environment module 202 and the trusted application 214. As indicated above, in some embodiments, the secure communication module 204 may be embodied as a secure architectural enclave that serves as a bridge between the two entities (e.g., between the trusted execution environment and a secure applet executing on the host operating system).

In some embodiments, the trusted application 214 and/or the trusted execution environment module 202 may build a flow control table (e.g., a truth table or bitmask table), which may be utilized (e.g., by the computing device 102 and/or the trusted sever 106) to perform smooth fine-control adaptive media streaming In some embodiments, the trusted execution environment module 202 derives a bitmask of the activity counters 126 read and exposes them as bitmasks to the trusted application 214. As such, the trusted application 214 may utilize the bitmasks to build a truth table that dynamically identifies a bottleneck in the media pipeline. Such information may be utilized to select the appropriate playback/security parameter to throttle or modify to achieve better flow control while maintaining security from the UHD content server (e.g., the trusted server 106) or the trusted application 214. In some embodiments, the table charts resources against parameters that may be vectored to scale. In such embodiments, the resources may be associated with security, video decoding, video encoding, graphics composition, display, network throughput, memory, and/or other resources; similarly, the parameters may be associated with the media resolution, bitrate, buffering, responsiveness, and/or other parameters. In other embodiments, it should be appreciated that the table and/or characteristics may correspond with audio or other media.

It should further be appreciated that the trusted execution environment module 202 may be established as or otherwise utilize various technologies including, for example, Intel® Software Guard Extensions (SGX), Trusted Execution Engine (TEE), Trusted Platform Module (TPM), Intel® Converged Security Engine (CSE), ARM® TrustZone®, Intel® Manageability Engine, Intel® Chaabi Security Engine, and/or other techniques and mechanisms for establishing a secure and trusted execution environment. Further, in some embodiments, the trusted execution environment module 202 may form a portion of the security co-processor 120.

The application execution module 206 is configured to execute various applications on the computing device 102. In particular, in the illustrative embodiment, the application execution module 206 executes the trusted application 214 (e.g., a trusted UHD DRM application). It should be appreciated that, in some embodiments, the trusted application 214 forms a portion of another application (e.g., a generally untrusted application). In some embodiments, the trusted application 214 may be executed in a secure enclave or other trusted execution environment.

The media streaming module 208 handles media streaming and/or other media playback functions of the computing device 102. As such, the media streaming module 208 controls changes in playback of the media content based on determined playback characteristics and/or user input (e.g., requesting a pause or stop in playback).

The communication module 210 handles the communication between the computing device 102 and remote devices (e.g., the trusted server 106) through the network 104. For example, as described herein, the communication module 210 may transmit new content playback characteristics to the trusted server 106 and/or receive media content for streaming from the trusted server 106.

Figure 3:
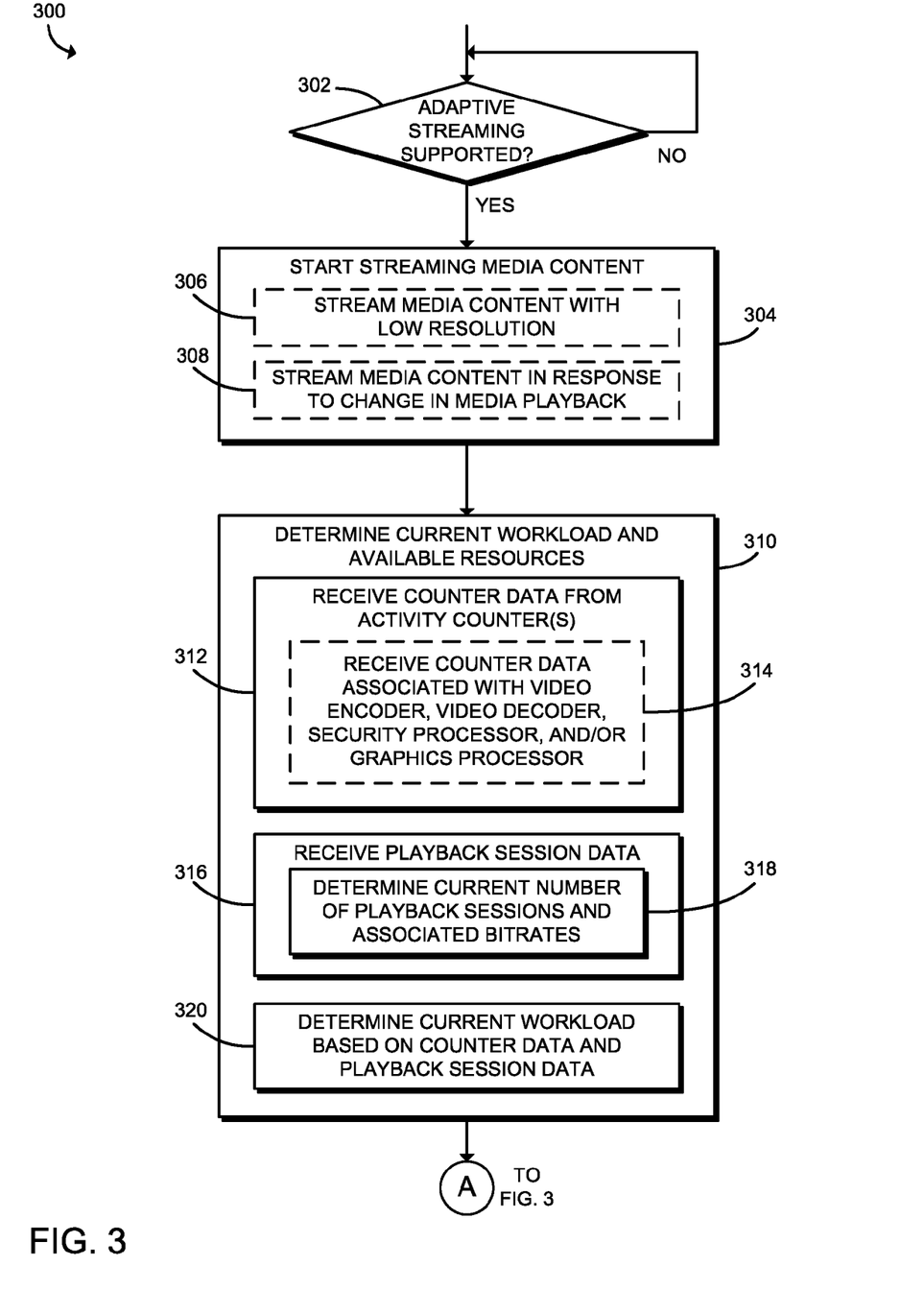
FIGS. 3-4 is a simplified flow diagram of at least one embodiment of a method for adaptive real-time media streaming by the computing device of the system of FIG. 1.
Figure 4:
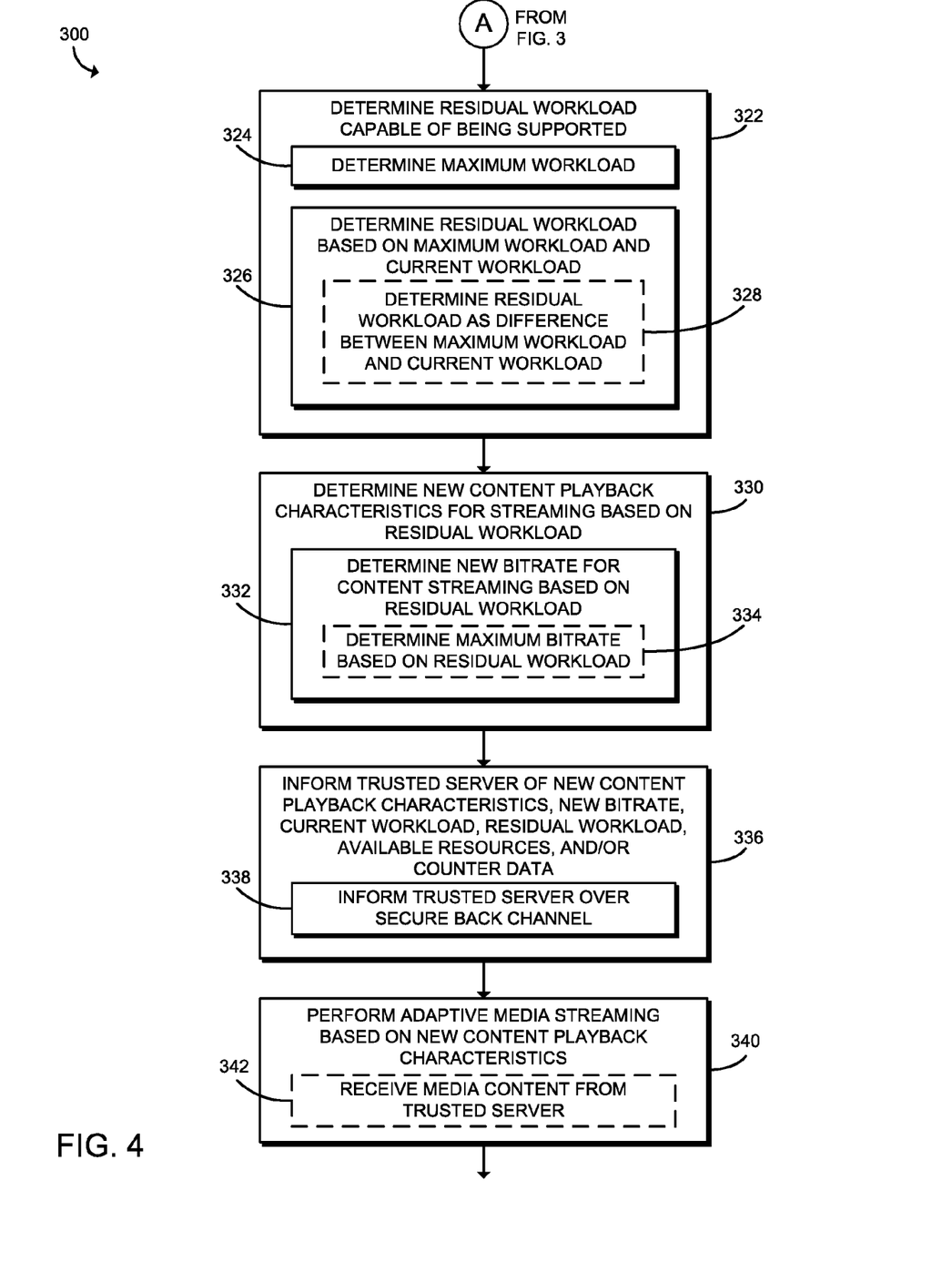

Referring now to FIGS. 3-4, in use, the computing device 102 may execute a method 300 for adaptive real-time media streaming (e.g., UHD DRM real-time media streaming). The illustrative method 300 begins with block 302 in which the computing device 102 determines whether adaptive streaming is supported. That is, the computing device 102 determines whether the functions described herein are supported. It should be appreciated that the computing device 102 may make such a determination based on any suitable technique or mechanism (e.g., based on the inclusion of a particular module of the computing device 102 described herein). If adaptive streaming is supported, the computing device 102 starts streaming media content in block 304. For example, depending on the particular embodiment, the computing device 102 may stream media content received from the trusted server 106 or another content providing device. In particular, in block 306, the computing device 102 may stream the media content at a low quality (e.g., a low resolution, a low frame rate, a low bitrate, etc.). For example, the computing device 102 may stream the media content at the lowest/base resolution possible by the computing device 102. It should be appreciated that doing so may permit all of the DRM (e.g., decryption) and media playback functions (e.g., decoding, encoding, etc.) to be performed in time that the media content may be streamed without audiovisual artifacts. In block 308, the computing device 102 may stream the media content in response to a change in the media playback. For example, the user of the computing device 102 may pause/resume playback of media content or select new media content for playback.

In block 310, the computing device 102 determines the current workload and available resources of the computing device 102. In doing so, in block 312, the computing device 102 receives counter data from the activity counters 126 (e.g., via a trusted execution environment and over an out-of-band communication channel) associated with the performance of the computing device 102 and/or power data from the power devices 122. In particular, the computing device 102 may receive counter data associated with network throughput, the buffer drain rate, video encoding, video decoding, security processing, graphics processing, and/or other IP block or component functions of the computing device 102. In block 316, the computing device 102 receives playback session data for the computing device 102. In particular, in block 318, the computing device 102 may determine a current number of playback sessions of the computing device 102 and associated media parameters (e.g., bitrates and/or other suitable parameters) of those sessions. In block 320, the computing device 102 determines a current workload of the computing device 102 based on the counter data and the playback session data. It should be appreciated that the current workload may represent how "busy" various components (e.g., IP blocks) of the computing device 102 are at a given point in time. In some embodiments, in determining the current workload, the computing device 102 may calculate a workload for one playback session and extrapolate that workload for current active playback sessions.

In block 322 of FIG. 4, the computing device 102 determines a residual workload capable of being supported by the computing device 102 (i.e., in addition to the current workload). In particular, in block 324, the computing device 102 determines a maximum workload capable of being supported by the computing device 102. It should be appreciated that the computing device 102 may make such a determination using any suitable technique, algorithm, and/or mechanism. For example, in some embodiments, the computing device 102 may store data associated with the maximum supported workload that may be retrieved. In other embodiments, the computing device 102 may analyze various factors to make such a determination; in such embodiments, the maximum supported workload may be dynamic In block 326, the computing device 102 determines the residual workload based on the maximum workload and the current workload. More specifically, in block 328, the computing device 102 may determine the residual workload as the difference between the maximum workload and the current workload. Of course, in other embodiments, the computing device 102 may otherwise determine the residual workload capable of being supported.

In block 330, the computing device 102 determines new content playback characteristics/parameters (e.g., resolution, bitrate, frame rate, and/or other parameters) for streaming based on the determined residual workload. For example, in block 332, the computing device 102 may determine a new bitrate for the content streaming based on the residual workload. In doing so, the computing device 102 may determine a maximum bitrate based on the residual workload in block 334. As described above, in some embodiments, the computing device 102 builds a flow control table that charts resources (e.g., security, video decoding, video encoding, graphics composition, display, network throughput, memory, and/or other resources) against parameters (e.g., media resolution, bitrate, buffering, responsiveness, and/or other parameters) of the computing device 102. As such, in some embodiments, the computing device 102 determines which of the parameters (and the extent by which) to modify in order to achieve the "best" user experience while maintaining security of the streamed content.

In block 336, the computing device 102 informs the trusted server 106 of the new content playback characteristics, current workload, residual workload, available resources, and/or counter data depending on the particular embodiment. For example, in some embodiments, the computing device 102 determines the appropriate media playback parameters and corresponding content delivery parameters and instructs the trusted server 106 accordingly. However, in other embodiments, the trusted server 106 makes such a determination based on the data provided by the computing device 102. In the illustrative embodiment, in block 338, the computing device 102 informs the trusted server 106 over a secure back channel established between the computing device 102 and the trusted server 106.

In block 340, the computing device 102 performs adaptive media streaming based on the new content playback characteristics (e.g., resolution, bitrate, buffering, and/or responsiveness). In doing so, the computing device 102 receives media content from the trusted server 106 (e.g., via the trusted application 214) for streaming. It should be appreciated that, in some embodiments, the media content is received and/or formatted based on the new content playback characteristics in order to provide a smooth user experience while maintaining the security of the media content.

For example, in one illustrative embodiment, a particular UHD DRM client may take the overall media workload into account when requesting the bitrate for media playback. If the network bandwidth permits one Mbps network throughput but there are multiple concurrent workloads running on the computing device 102 that limit the handling capable of a new workload to only 500 kbps for the streaming session, the computing device 102 may request the media content from the trusted server 106 at 500 kbps for streaming In another illustrative embodiment, the computing device 102 may utilize data collected from the activity counters 126 of a security engine and graphics processing unit (e.g., video decoder, graphics renderer, and display engines) to determine the dynamic workload and overhead in performing DRM decryption, secure content parsing, Protected Audio Video Path (PAVP) transcription/decryption, Intel® Wireless Display (WiDi) encoding, and/or other functions in order to determine the appropriate workload the computing device 102 can handle without compromising the user experience.

EXAMPLES

Illustrative examples of the technologies disclosed herein are provided below. An embodiment of the technologies may include any one or more, and any combination of, the examples described below.

Example 1 includes a computing device for adaptive real-time media streaming, the computing device comprising at least one activity counter to record data associated with performance of the computing device; a trusted execution environment module to (i) determine a current workload of the computing device based on at least one activity counter, wherein the at least one activity counter is to record counter data associated with performance of the computing device, (ii) determine a residual workload capable of being supported by the computing device based on the determined current workload, and (iii) determine new content playback characteristics for streaming media content based on the determined residual workload; and a media streaming module to stream media content received from a trusted server based on the determined new content playback characteristics.

Example 2 includes the subject matter of Example 1, and wherein to determine the current workload of the computing device comprises to determine the current workload in response to a determination to stream the media content.

Example 3 includes the subject matter of any of Examples 1 and 2, and wherein to determine to stream the media content comprises to determine to stream the media content at a low quality.

Example 4 includes the subject matter of any of Examples 1-3, and wherein to determine to stream the media content at a low quality comprises to determine to stream the media content at one or more of a low resolution, a low bitrate, or a low frame rate.

Example 5 includes the subject matter of any of Examples 1-4, and wherein to determine to stream the media content comprises to determine to stream the media content in response to a change in media playback.

Example 6 includes the subject matter of any of Examples 1-5, and further including at least one of a video encoder, a video decoder, a security processor, or a graphics processor; wherein to determine the current workload of the computing device comprises to receive counter data associated with at least one of at least one of the video encoder, the video decoder, the security processor, or the graphics processor.

Example 7 includes the subject matter of any of Examples 1-6, and wherein to determine the current workload of the computing device comprises to receive playback session data of the computing device, wherein the playback session data identifies a current number of playback sessions of the computing device and associated media parameters of the playback sessions.

Example 8 includes the subject matter of any of Examples 1-7, and wherein to determine the current workload of the computing device comprises to determine a current workload of the computing device based on the counter data of the at least one activity counter and the playback session data.

Example 9 includes the subject matter of any of Examples 1-8, and wherein to determine the residual workload comprises to determine a maximum workload capable of being supported by the computing device.

Example 10 includes the subject matter of any of Examples 1-9, and wherein to determine the residual workload comprises to determine the residual workload as a difference between the maximum workload and the current workload of the computing device.

Example 11 includes the subject matter of any of Examples 1-10, and wherein to determine the new content playback characteristics comprises to determine a new bitrate for streaming media content based on the determined residual workload.

Example 12 includes the subject matter of any of Examples 1-11, and wherein to determine the new bitrate comprises to determine a maximum bitrate capable of being supported by the computing device based on the determined residual workload.

Example 13 includes the subject matter of any of Examples 1-12, and further including a communication module to inform the trusted server of the determined new content playback characteristics.

Example 14 includes the subject matter of any of Examples 1-13, and wherein to inform the trusted server comprises to transmit the determined new content playback characteristics to the trusted server over a secure back channel established between the computing device and the trusted server.

Example 15 includes the subject matter of any of Examples 1-14, and further including a communication module to inform the trusted server of at least one of the counter data recorded by the at least one activity counter, the determined current workload, or the determined residual workload.

Example 16 includes the subject matter of any of Examples 1-15, and wherein the trusted execution environment module is to receive the counter data over a secure communication channel.

Example 17 includes the subject matter of any of Examples 1-16, and further including a dedicated electrical trace between the trusted execution environment module and the at least one activity counter; wherein to receive the counter data comprises to receive the counter data over the dedicated electrical trace.

Example 18 includes a method for adaptive real-time media streaming by a computing device, the method comprising determining, by a trusted execution environment of the computing device, a current workload of the computing device based on at least one activity counter, wherein the at least one activity counter is to record counter data associated with performance of the computing device; determining, by the computing device, a residual workload capable of being supported by the computing device based on the determined current workload; determining, by the computing device, new content playback characteristics for streaming media content based on the determined residual workload; and performing, by the computing device, streaming of media content received from a trusted server based on the determined new content playback characteristics.

Example 19 includes the subject matter of Example 18, and wherein determining the current workload of the computing device comprises determining the current workload in response to determining to stream the media content.

Example 20 includes the subject matter of any of Examples 18 and 19, and wherein determining to stream the media content comprises determining to stream the media content at a low quality.

Example 21 includes the subject matter of any of Examples 18-20, and wherein determining to stream the media content at a low quality comprises determining to stream the media content at one or more of a low resolution, a low bitrate, or a low frame rate.

Example 22 includes the subject matter of any of Examples 18-21, and wherein determining to stream the media content comprises determining to stream the media content in response to a change in media playback.

Example 23 includes the subject matter of any of Examples 18-22, and wherein determining the current workload of the computing device comprises receiving counter data associated with at least one of a video encoder, a video decoder, a security processor, or a graphics processor of the computing device.

Example 24 includes the subject matter of any of Examples 18-23, and wherein determining the current workload of the computing device comprises receiving playback session data of the computing device, wherein the playback session data identifies a current number of playback sessions of the computing device and associated media parameters of the playback sessions.

Example 25 includes the subject matter of any of Examples 18-24, and wherein determining the current workload of the computing device comprises determining a current workload of the computing device based on the counter data of the at least one activity counter and the playback session data.

Example 26 includes the subject matter of any of Examples 18-25, and wherein determining the residual workload comprises determining a maximum workload capable of being supported by the computing device.

Example 27 includes the subject matter of any of Examples 18-26, and wherein determining the residual workload comprises determining the residual workload as a difference between the maximum workload and the current workload of the computing device.

Example 28 includes the subject matter of any of Examples 18-27, and wherein determining the new content playback characteristics comprises determining a new bitrate for streaming media content based on the determined residual workload.

Example 29 includes the subject matter of any of Examples 18-28, and wherein determining the new bitrate comprises determining a maximum bitrate capable of being supported by the computing device based on the determined residual workload.

Example 30 includes the subject matter of any of Examples 18-29, and further including informing, by the computing device, the trusted server of the determined new content playback characteristics.

Example 31 includes the subject matter of any of Examples 18-30, and wherein informing the trusted server comprises transmitting the determined new content playback characteristics to the trusted server over a secure back channel established between the computing device and the trusted server.

Example 32 includes the subject matter of any of Examples 18-31, and further including informing, by the computing device, the trusted server of at least one of the counter data recorded by the at least one activity counter, the determined current workload, or the determined residual workload.

Example 33 includes the subject matter of any of Examples 18-32, and further including receiving the counter data by the trusted execution environment of the computing device over a secure communication channel.

Example 34 includes the subject matter of any of Examples 18-33, and wherein receiving the counter data comprises receiving the counter data by the trusted execution environment over a dedicated electrical trace.

Example 35 includes a computing device comprising a processor; and a memory having stored therein a plurality of instructions that when executed by the processor cause the computing device to perform the method of any of Examples 18-34.

Example 36 includes one or more machine-readable storage media comprising a plurality of instructions stored thereon that, in response to execution by a computing device, cause the computing device to perform the method of any of Examples 18-34.

Example 37 includes a computing device for adaptive real-time media streaming, the computing device comprising means for determining, by a trusted execution environment of the computing device, a current workload of the computing device based on at least one activity counter, wherein the at least one activity counter is to record counter data associated with performance of the computing device; means for determining a residual workload capable of being supported by the computing device based on the determined current workload; means for determining new content playback characteristics for streaming media content based on the determined residual workload; and means for performing streaming of media content received from a trusted server based on the determined new content playback characteristics.

Example 38 includes the subject matter of Example 37, and wherein the means for determining the current workload of the computing device comprises means for determining the current workload in response to determining to stream the media content.

Example 39 includes the subject matter of any of Examples 37 and 38, and wherein the means for determining to stream the media content comprises means for determining to stream the media content at a low quality.

Example 40 includes the subject matter of any of Examples 37-39, and wherein the means for determining to stream the media content at a low quality comprises means for determining to stream the media content at one or more of a low resolution, a low bitrate, or a low frame rate.

Example 41 includes the subject matter of any of Examples 37-40, and wherein the means for determining to stream the media content comprises means for determining to stream the media content in response to a change in media playback.

Example 42 includes the subject matter of any of Examples 37-41, and wherein the means for determining the current workload of the computing device comprises means for receiving counter data associated with at least one of a video encoder, a video decoder, a security processor, or a graphics processor of the computing device.

Example 43 includes the subject matter of any of Examples 37-42, and wherein the means for determining the current workload of the computing device comprises means for receiving playback session data of the computing device, wherein the playback session data identifies a current number of playback sessions of the computing device and associated media parameters of the playback sessions.

Example 44 includes the subject matter of any of Examples 37-43, and wherein the means for determining the current workload of the computing device comprises means for determining a current workload of the computing device based on the counter data of the at least one activity counter and the playback session data.

Example 45 includes the subject matter of any of Examples 37-44, and wherein the means for determining the residual workload comprises means for determining a maximum workload capable of being supported by the computing device.

Example 46 includes the subject matter of any of Examples 37-45, and wherein the means for determining the residual workload comprises means for determining the residual workload as a difference between the maximum workload and the current workload of the computing device.

Example 47 includes the subject matter of any of Examples 37-46, and wherein the means for determining the new content playback characteristics comprises means for determining a new bitrate for streaming media content based on the determined residual workload.

Example 48 includes the subject matter of any of Examples 37-47, and wherein the means for determining the new bitrate comprises means for determining a maximum bitrate capable of being supported by the computing device based on the determined residual workload.

Example 49 includes the subject matter of any of Examples 37-48, and further including means for informing the trusted server of the determined new content playback characteristics.

Example 50 includes the subject matter of any of Examples 37-49, and wherein the means for informing the trusted server comprises means for transmitting the determined new content playback characteristics to the trusted server over a secure back channel established between the computing device and the trusted server.

Example 51 includes the subject matter of any of Examples 37-50, and further including means for informing the trusted server of at least one of the counter data recorded by the at least one activity counter, the determined current workload, or the determined residual workload.

Example 52 includes the subject matter of any of Examples 37-51, and further including means for receiving the counter data by the trusted execution environment of the computing device over a secure communication channel.

Example 53 includes the subject matter of any of Examples 37-52, and wherein the means for receiving the counter data comprises means for receiving the counter data by the trusted execution environment over a dedicated electrical trace.

The invention claimed is:

1. A computing device for adaptive real-time media streaming, the computing device comprising:
   a processor;
   at least one activity counter to record data associated with performance of the computing device;
   a hardware-based trusted execution environment module to provide an execution environment isolated from execution of the processor to (i) determine a current workload of the computing device based on at least one activity counter, wherein the at least one activity counter is to record counter data associated with performance of the computing device, (ii) determine a residual workload capable of being supported by the computing device based on the determined current workload, (iii) determine new content playback characteristics for streaming media content based on the determined residual workload, (iv) establish a secure connection between the computing device and a trusted server with use of secure credentials, wherein the processor does not have access to the secure credentials; and
   a media streaming module to stream media content received from the trusted server through the secure connection, wherein the streamed media content is based on the determined new content playback characteristics.

2. The computing device of claim 1, wherein to determine the current workload of the computing device comprises to determine the current workload in response to a determination to stream the media content.

3. The computing device of claim 2, wherein to determine to stream the media content comprises to determine to stream the media content at a low quality.

4. The computing device of claim 3, wherein to determine to stream the media content at a low quality comprises to determine to stream the media content at one or more of a low resolution, a low bitrate, or a low frame rate.

5. The computing device of claim 2, wherein to determine to stream the media content comprises to determine to stream the media content in response to a change in media playback.

6. The computing device of claim 1, wherein to determine the current workload of the computing device comprises to receive playback session data of the computing device, wherein the playback session data identifies a current number of playback sessions of the computing device and associated media parameters of the playback sessions.

7. The computing device of claim 6, wherein to determine the current workload of the computing device comprises to determine a current workload of the computing device based on the counter data of the at least one activity counter and the playback session data.

8. The computing device of claim 1, wherein to determine the residual workload comprises to determine a maximum workload capable of being supported by the computing device.

9. The computing device of claim 8, wherein to determine the residual workload comprises to determine the residual workload as a difference between the maximum workload and the current workload of the computing device.

10. The computing device of claim 1, wherein to determine the new content playback characteristics comprises to determine a new bitrate for streaming media content based on the determined residual workload.

11. The computing device of claim 10, wherein to determine the new bitrate comprises to determine a maximum bitrate capable of being supported by the computing device based on the determined residual workload.

12. The computing device of claim 1, further comprising a communication module to transmit the determined new content playback characteristics to the trusted server over a secure back channel established between the computing device and the trusted server.

13. The computing device of claim 1, further comprising a communication module to inform the trusted server of at least one of the counter data recorded by the at least one activity counter, the determined current workload, or the determined residual workload.

14. The computing device of claim 1, wherein the trusted execution environment module is to receive the counter data over a secure communication channel.

15. The computing device of claim 14, further comprising a dedicated electrical trace between the trusted execution environment module and the at least one activity counter; wherein to receive the counter data comprises to receive the counter data over the dedicated electrical trace.

16. The computing device of claim 1, wherein to establish the secure connection comprises to share secure credentials with the trusted server by the hardware-based trusted execution environment module of the computing device.

17. One or more non-transitory machine-readable storage media comprising a plurality of instructions stored thereon that, in response to execution by a computing device, cause the computing device to:
   determine, by a hardware-based trusted execution environment of the computing device, a current workload of the computing device based on at least one activity counter, wherein the at least one activity counter is to record counter data associated with performance of the computing device, wherein the hardware-based trusted execution environment provides an execution environment isolated from execution of the computing device;
   determine a residual workload capable of being supported by the computing device based on the determined current workload;
   determine new content playback characteristics for streaming media content based on the determined residual workload;
   establish a secure connection between the computing device and a trusted server with use of secure credentials, wherein a processor of the computing device does not have access to the secure connection; and
   stream media content received from the trusted server through the secure connection, wherein the streamed media content is based on the determined new content playback characteristics.

18. The one or more non-transitory machine-readable storage media of claim 17, wherein to determine the current workload of the computing device comprises to determine the current workload in response to a determination to stream the media content; and wherein to determine to stream the media content comprises to determine to stream the media content in response to a change in media playback.

19. The one or more non-transitory machine-readable storage media of claim 17, wherein to determine the current workload of the computing device comprises to receive counter data associated with at least one of a video encoder, a video decoder, a security processor, or a graphics processor of the computing device.

20. The one or more non-transitory machine-readable storage media of claim 17, wherein to determine the current workload of the computing device comprises to:

receive playback session data of the computing device, wherein the playback session data identifies a current number of playback sessions of the computing device and associated media parameters of the playback sessions; and determine a current workload of the computing device based on the counter data of the at least one activity counter and the playback session data.

21. The one or more non-transitory machine-readable storage media of claim 17, wherein to determine the residual workload comprises to:

determine a maximum workload capable of being supported by the computing device; and determine the residual workload as a difference between the maximum workload and the current workload of the computing device.

22. The one or more non-transitory machine-readable storage media of claim 17, wherein the plurality of instructions further cause the computing device to transmit the determined new content playback characteristics to the trusted server over a secure back channel established between the computing device and the trusted server.

23. A method for adaptive real-time media streaming by a computing device, the method comprising:

determining, by a hardware-based trusted execution environment of the computing device, a current workload of the computing device based on at least one activity counter, wherein the at least one activity counter is to record counter data associated with performance of the computing device, wherein the hardware-based trusted execution environment provides an execution environment isolated from execution of the computing device;

determining, by the computing device, a residual workload capable of being supported by the computing device based on the determined current workload;

determining, by the computing device, new content playback characteristics for streaming media content based on the determined residual workload;

establishing, by the computing device, a secure connection between the computing device and a trusted server with use of secure credentials, wherein a processor of the computing device does not have access to the secure credentials; and performing, by the computing device, streaming of media content received from the trusted server through the secure connection, wherein the streamed media content is based on the determined new content playback characteristics.

24. The method of claim 23, wherein determining the current workload of the computing device comprises receiving counter data associated with at least one of a video encoder, a video decoder, a security processor, or a graphics processor of the computing device.

25. The method of claim 23, wherein determining the current workload of the computing device comprises (i) receiving playback session data of the computing device, wherein the playback session data identifies a current number of playback sessions of the computing device and associated media parameters of the playback sessions and (ii) determining a current workload of the computing device based on the counter data of the at least one activity counter and the playback session data; and wherein determining the residual workload comprises (i) determining a maximum workload capable of being supported by the computing device and (ii) determining the residual workload as a difference between the maximum workload and the current workload of the computing device.

* * * * *